United States Patent
Singh et al.

(10) Patent No.: US 8,715,612 B2
(45) Date of Patent: May 6, 2014

(54) PROCESS FOR PREPARING ZINC PEROXIDE NANOPARTICLES

(71) Applicant: Council of Scientific & Industrial Research, New Delhi (IN)

(72) Inventors: Nahar Singh, New Delhi (IN); Rashmi, New Delhi (IN); Sukhvir Singh, New Delhi (IN); Renu Pashricha, New Delhi (IN); Prabhat Kumar Gupta, New Delhi (IN); Daya Soni, New Delhi (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 13/960,311

(22) Filed: Aug. 6, 2013

(65) Prior Publication Data
US 2013/0324673 A1 Dec. 5, 2013

Related U.S. Application Data

(63) Continuation of application No. 13/046,480, filed on Mar. 11, 2011.

(30) Foreign Application Priority Data

Mar. 12, 2010 (IN) .......................... 0578/DEL/2010

(51) Int. Cl.
*C01B 15/00* (2006.01)

(52) U.S. Cl.
USPC ...................... 423/582; 423/594.14; 977/773

(58) Field of Classification Search
None
See application file for complete search history.

(56) References Cited

U.S. PATENT DOCUMENTS

| | | | |
|---|---|---|---|
| 3,926,754 A | 12/1975 | Lee |
| 4,036,726 A | 7/1977 | Gale et al. |
| 4,123,339 A | 10/1978 | Gale et al. |
| 4,163,716 A | 8/1979 | Turnbull |
| 4,490,257 A | 12/1984 | Becker |
| 4,566,975 A | 1/1986 | Allgulin |
| 4,880,510 A | 11/1989 | Uhrich |
| 5,043,080 A | 8/1991 | Cater et al. |
| 2007/0086935 A1 | 4/2007 | Chen et al. |
| 2009/0018668 A1 | 1/2009 | Galbraith |

OTHER PUBLICATIONS

Arun Joshi et al., "Removal of Arsenic from Ground Water by Iron Oxide-Coated Sand", Journal of Environmental Engineering, Aug. 1996, pp. 769-771.
Jenny Weijun Wang et al., "Removal of Arsenic from Synthetic Acid Mine Drainage by Electrochemical pH Adjustment and Coprecipitation with Iron Hydroxide", Environ. Sci. Technol. 2003, 37, pp. 4500-4506.
"Chromium in Drinking Water: A Technical Information Primer", American Water Works Association, Hexavalent Chromium: A Technical Information Primer Developed for AWWA by Jacobs Engineering Group, pp. 1-10.
Jay H. Lubin et al., "Inorganic Arsenic in Drinking Water: An Evolving Public Health Concern", JNCI, vol. 99, Issue 12, Jun. 20, 2007, pp. 906-907.
A. LJ Bojic et al., "Removal of chromium (VI) from water by micro-alloyed aluminum composite (MAIC) under flow conditions", Water SA vol. 30, No. 3, Jul. 2004, pp. 353-360.

(Continued)

*Primary Examiner* — Melvin Curtis Mayes
*Assistant Examiner* — Melissa Stalder
(74) *Attorney, Agent, or Firm* — Foley & Lardner LLP

(57) ABSTRACT

Zinc peroxide nanoparticles, used for arsenic and chromium removal, were synthesized using zinc acetate di-hydrate as precursors in ammonical water medium at room temperature.

5 Claims, 4 Drawing Sheets

XRD Pattern of ZnO$_2$ powder

(56) References Cited

OTHER PUBLICATIONS

Ioannis A. Katsoyiannis et al., "Arsenic removal from groundwaters containing iron, ammonium, manganese and phosphate: A case study from a treatment unit in northern Greece", Desalination 224 (2008), 330-339.

Non-Final Office Action U.S. Appl. No. 13/045,480 dated Mar. 20, 2013.

Non-Final Office Acton U.S. Appl. No. 13/046,480 dated Sep. 21, 2012.

Satish I. Kuriyavar et al., "Nanosphere Oxides for Environmental Remediation", 2005, Oklahoma State University, pp. 1, 2, 6 & 7.

Liora Rosenthal-Toib et al., "Synthesis of stabilized nanoparticles of zinc peroxide", Mar. 1, 2008, Chemical Engineering Journal, vol. 136, Issues 2-3, pp. 425-429.

Health Canada: "Chromium", Jan. 1979 (Updated Sep. 1986) Health Canada.

Office Action received in U.S. Appl. No. 13/046,480 mailed Aug. 8, 2013.

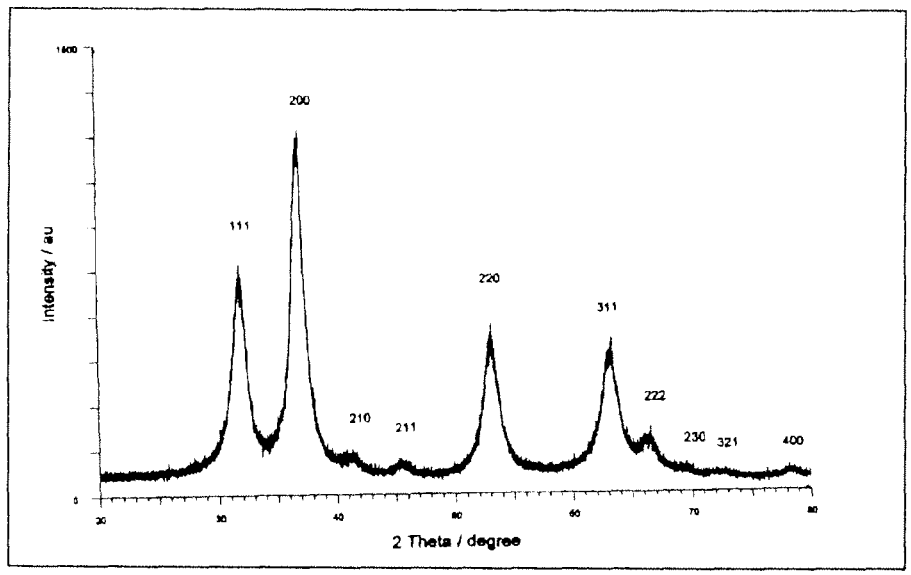
Fig. 1 XRD Pattern of ZnO₂ powder
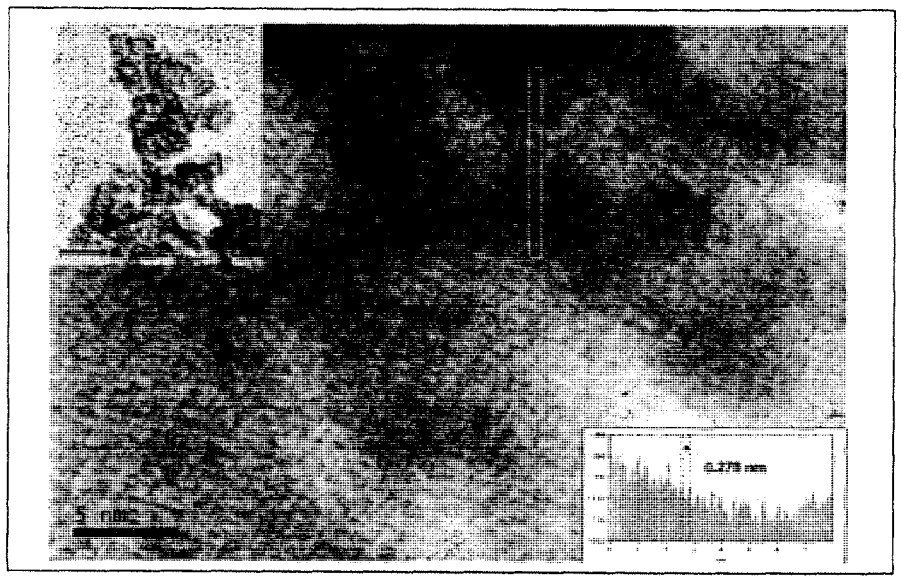
Fig. 2 TEM of ZnO₂ powder as synthesized

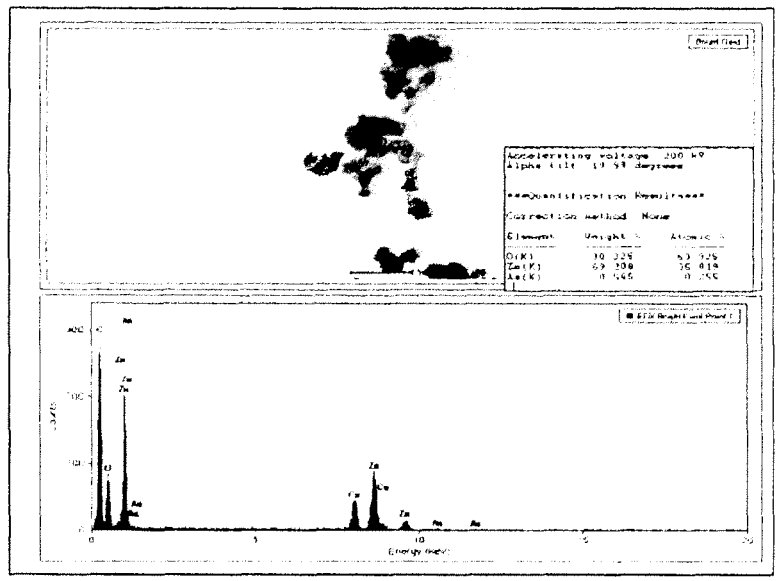
Fig. 3 TEM and EDAX of ZnO$_2$ powder after arsenic removing
Fig. 4 TEM of ZnO$_2$ powder after Arsenic removing

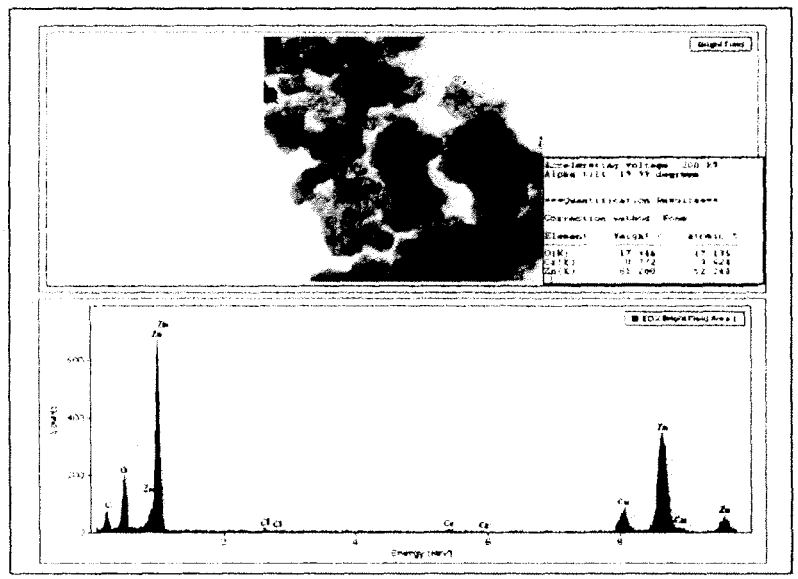
Fig. 5 TEM and EDAX of ZnO$_2$ powder after removing chromium
Fig. 6 TEM of ZnO$_2$ powder after removing chromium

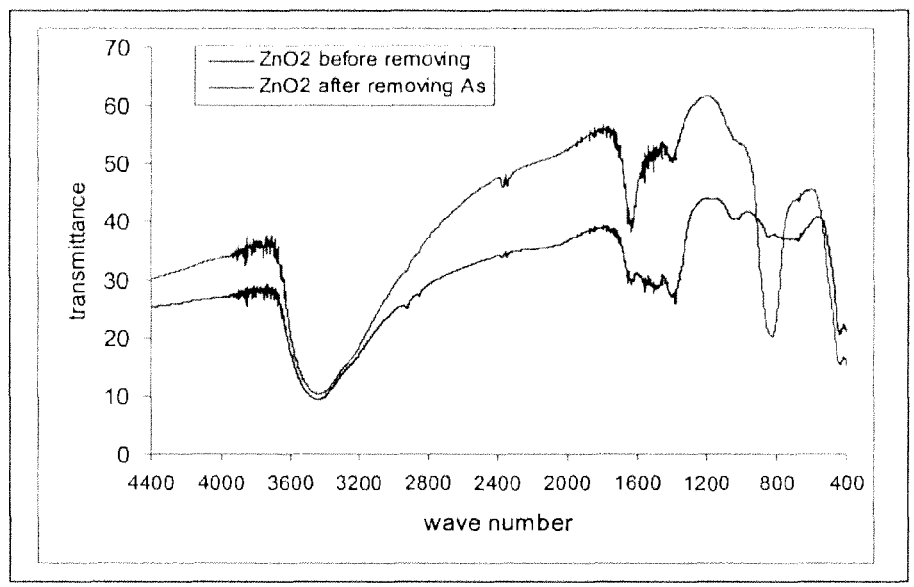
Fig. 7 FTIR of ZnO$_2$ powder after arsenic removing
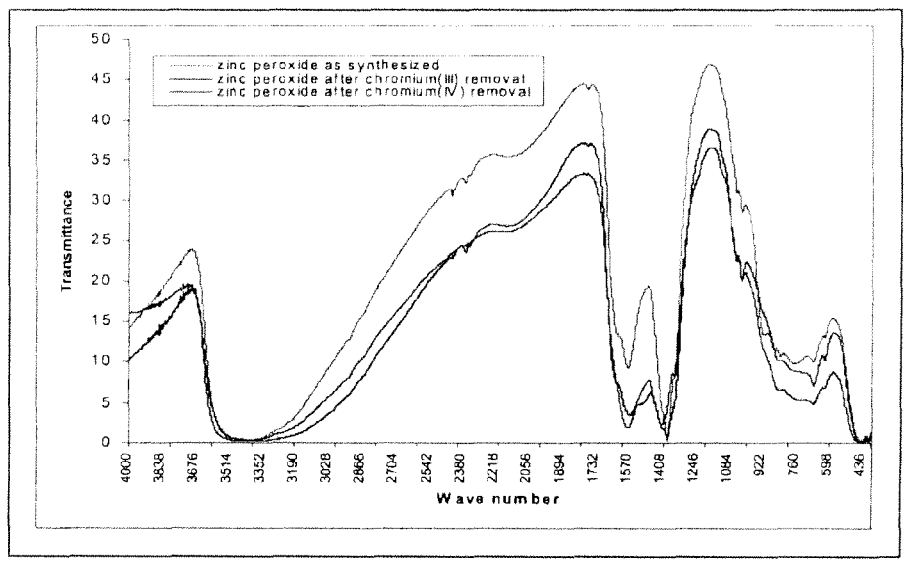
Fig. 8 FTIR of ZnO$_2$ powder after chromium (III) and chromium (VI) removal

PROCESS FOR PREPARING ZINC PEROXIDE NANOPARTICLES

This application is a Continuation of U.S. application Ser. No. 13/046,480, filed Mar. 11, 2011, which claims priority to India Patent application Serial No. 0578/DEL/2010, filed Mar. 12, 2010, the respective contents of both applications are incorporated herein by reference.

FIELD OF THE INVENTION

The present invention relates to a process for the removal of arsenic and Chromium [Cr(III) & Cr(VI)] from contaminated water. Particularly, the present invention relates to a process for the removal of arsenic and chromium from contaminated water using nanoparticles of zinc peroxide ($ZnO_2$) capped with glycerol/triethylamine (TEA)/poly vinyl pyrrolidone (PVP). More particularly, the present invention relates to a process for the removal of arsenic and chromium from the contaminated water to a level that is suitable for safe drinking.

BACKGROUND OF THE INVENTION

Presence of arsenic (As) and chromium metal ions in drinking water has become the issue of global concern. Long-term exposure to even low concentrations of arsenic in the drinking water may cause skin, lung or prostate cancer and cardiovascular, pulmonary, immunological and neurological disorder [Environment Health Criteria 224, *Arsenic and Arsenic Compounds*, Second edition, World Health Organization 2001; S. Shevade and R. G. Ford. Use of synthetic zeolites for arsenate removal from pollutant water. Water Res. 38(14-15), 3197 (2004)].

At present there is no effective medicine available, which can treat disease, causes by arsenic and chromium, so use of arsenic and chromium free water can help the affected person to get rid of the symptoms of arsenic and chromium toxicity. Hence, the requirement of arsenic and chromium free water is urgently desired to mitigate arsenic and chromium toxicity and protection of the health of human beings living in the areas affected by arsenic and chromium contamination.

World Health Organization (WHO) & Environment Protection Agency (EPA) has established a level of 10 µg/L arsenic and 50 µg/L of chromium in drinking water from January 2006. But in several countries like Bangladesh, India, arsenic and chromium concentration in the drinking water can be as high as 500 µg/L or more. The reduction of arsenic and chromium from such high concentrations and made it potable as per WHO prescribe limit is a very challenging task.

Arsenic occurs in rocks, soil, water and air in −3, 0, +3 and +5 valence state. It is widely distributed having average concentration of 2 mg/kg. The burning of fossil fuels, refining of petroleum mining, smelting of metals like Zn, Cu, Ni, and Pb, are major anthropogenic sources for arsenic contamination in air, water and soil.

Therefore high toxicity and widespread occurrence created a pressing need for effective monitoring, measurement and remediation of arsenic in soil and groundwater. The effect and degree of toxicity of arsenic depends on its inorganic or organic forms and oxidation state. Inorganic arsenicals are more toxic than organic arsenicals and in inorganic arsenicals trivalent form is more toxic than the pentavalent form.

Reference may be made to Y. Lee, I. H. Um and J. Yoon, Arsenic (III) oxidation by iron(VI) (ferrate) and subsequent removal of arsenic (V) by iron (III) coagulation. Environ. Sci. Technol. 37(24), 5750 (2003); B. Daus. R. Wennrich and H. Weiss, Sorption materials for arsenic removal from water: a comparative study. Water Res. 38(12), 2948 (2004); S. Bang, G. P. Korfiatis and X. Meng, Removal of arsenic from water by zero-valent iron. J. Hazard Mater. 121(1-3), 61 (2005); Y. S. Shen. Study of arsenic removal from drinking water. J. American Water Works Association, 65(8), 543 (1973) and A. Joshi and M. Chaudhary. Removal of arsenic from groundwater by iron-oxide-coated sand. ASCE J. Environ. Engineering. 122(8), 769 (1996), which discloses several methods for the removal of arsenic from contaminated water to the consumable limit.

In U.S. Pat. No. 4,566,975, heavy metals such as arsenic are removed in a two step process which involves an alkaline precipitation carried out at a pH of at least about 8 and using ferrous sulfate as an additive.

In U.S. Pat. No. 4,880,510, the electrolytic cell has been used to remove color impurities such as dyes from wastewater solution. The ferrous iron generated at the anode reacts with hydroxide ion to form an iron complex or compound, which further was found to react with or otherwise remove the color bodies from aqueous media as an insoluble precipitate.

In U.S. Pat. No. 4,490,257, contaminants are removed by electrolysis process. The electrodes are resistant to corrosion.

In U.S. Pat. No. 5,043,080, contaminated groundwater is treated with hydrogen peroxide and transition metal ions at an acid pH in the presence of ultraviolet light. The main object, however, is the removal of organic contaminants rather than heavy metals.

In U.S. Pat. No. 4,163,716, it was recognized that heavy metals and color bodies from dye house affluent could be removed with ferrous ions supplied by iron electrodes with the ferrous ion oxidizing to the ferric state by use of an oxidizing agent such as hydrogen peroxide. At a pH of between 7 and 9, heavy metals and traces of color adhere to the ferric hydroxide floc, which then may be removed. This process also involves a pH adjustment from a reaction pH of below 6.5 to a pH of from 7 to 9 to achieve removal of color particles.

The common technologies used for removal of arsenic are oxidation, co-precipitation, adsorption onto sorptive media, ion exchange resin and membrane techniques etc. Presently, various materials like activated carbon (AC), zirconium coated activated carbon (Zr-AC) [B. Daus, R. Wennrich and H. Weiss, Sorption materials for arsenic removal from water: a comparative study. Water Res. 38(12), 2948 (2004)]; iron hydroxide [W. Wang, D. Bejan and N. J. Bunco, Removal of arsenic from synthetic acid mine drainage by electrochemical pH adjustment and co-precipitation with iron hydroxide. Environ. Sci. Technol. 37(19), 4500 (2003)]; iron (II) and iron (III) oxides [L. C. Roberts, S. J. Hug, T. Ruettimann, M. Billah, A. W. Khan and M. T. Rahman; Arsenic removal with iron (II) and iron (III) in waters with high silicate and phosphate concentrations, Environ. Sci. Technol. 38(1), 307 (2004)], sand and zero-valent iron [O. X. Leupin and S. J. Hug. Oxidation and removal of arsenic(III) from aerated groundwater by filtration through sand and zero-valent iron; Water Res. 39(9), 1729 (2005)], hardened paste of Portland cement [Kundu, S. S. Kavalakatt, A. Pal, S. K. Ghosh, M. Mandal and T. Pal; Removal of arsenic using hardened paste of Portland cement: batch adsorption and column study. Water Res. 38(17), 3780 (2004)]: iron oxide coated polymers [A. Katasoyiannis and A. I. Zouboulis, Removal of arsenic from contaminated water sources by sorption onto iron-oxide-coated polymeric materials, Water Res. 36(20), 5141 (2002)]; biological systems (bacteria) [A. Katasoyiannis and A. I. Zouboulis; [Application of biological processes for the removal of arsenic from groundwater] Water Res. 38(1), 17

(2004)] has been removed arsenic from contaminated water through biological process and could be used for drinking and other household utilities.

The above materials and methods are effective and reduce arsenic concentration in the potable water up to acceptable limits. But these materials and methods have their own advantages and disadvantages like, oxidation process is very simple and low cost but it is very slow and removes only a part of the arsenic, co-precipitation by alum or iron is again simple and low capital arrangement but it produces toxic sludge's and pre-oxidation is required to start the reaction.

The use of iron or iron oxide for removing arsenic is dominative as it is very cheap, highly effective and can purify large volume of water. In this process, arsenite ($As^{3+}$) species is first oxidized to arsenate ($As^{5+}$) in the presence of atmospheric oxygen, or Ozone or free chlorine. Reference may be made to G. Hering, P. Y. Chen. J. A. Wilkie, M. Elimelech and S. Liang. Arsenic removal by ferric chloride. J. American Water Works Association; 88(4), 155 (1996). Wherein the arsenate species got adsorbed over the surface of iron oxide during filtration and are removed from the contaminated water. Roberts L. C., et al. have used Fe (II) and Fe (III) to remove arsenic from water with high silicate and phosphate concentrations.

Reference may be made to Daus B. et al. Water Res. 2004 July; 38-(12): 2948-54 that has proved that arsenite and arsenate can be removed from water using Activated carbon (AC), zirconium loaded Activated carbon with other materials successfully.

Reference may be made to Water Res. 2003 May; 37(10): 2478-88, wherein the arsenic was effectively removed by steel manufacturing byproducts like evaporation cooler dust (ECD), oxygen gas sludge (OGS), and basic oxygen furnace slag (BOFS).

Reference may be made to Bang S. et al. J. Hazard Mater. 2005 May 20, 121(1-3): 61-67, who has reported effect of dissolved oxygen and pH on the removal of Arsenic from water and concluded that at pH 6 that arsenate removal (99.8%) was faster than arsenite (82.6%) and more dissolved oxygen and low pH increases the rate of iron corrosion and leads to the formation of iron hydroxide, which ultimately adsorbs arsenic from the solution.

Reference may be made to S. Kundu, S. S. Kavalakatt, A. Pal, S. K. Ghosh, M. Mandal, and T. Pal, Water Res. 2004 October; 38(17): 3780-90 wherein Portland cement (HPPC) paste has been used as adsorbent for the removal of arsenic from water and have shown that 95% arsenate and 88% Arsenite can be removed easily.

Reference may be made to Sarkar, A. et al. Water Res. 2005 May; 39(10): 2196-206 wherein activated alumina has been used as adsorbent for arsenic removal from drinking water.

Reference may be made to Bang S. et al. Chemosphere. (2005) July; 60(3): 389-97 wherein granular titanium dioxide ($TiO_2$) has been used for the removal of arsenic from groundwater. Reference may be made to Oklahoma State University, USA, Advanced ceramic reports; Issue: August 2004, page: 6 wherein Porous Zinc oxide heads has been used to remove arsenic from the contaminated water.

Chromium is a common heavy metal contaminant of water supplies, largely arising from the textile, leather and wood production industries. The metal industry mainly discharged trivalent chromium. Hexavalent chromium in industrial wastewater mainly originates from tanning and painting. Chromium may be applied as a catalyser, in wood impregnation, in audio and video production and in lasers. Chromite is the starting product for inflammable material and chemical production. Levels of chromium in drinking water have been controlled in the past by expensive, often toxic chemical based cleansing procedures.

Trivalent chromium is a dietary requirement for a number of organisms as trivalent chromium is an essential trace element for humans and with insulin it removes glucose from blood and also plays a vital role in fat metabolism.

But hexavalent chromium is very toxic to flora and fauna. The human body contains approximately 0.03 ppm of chromium. Daily intake of chromium depends upon feed and levels, and is usually approximately 15-200 µg, but may be as high as 1 mg. The Placenta is the organ having highest chromium amounts. Chromium deficits may enhance diabetes symptoms. Chromium can also be found in RNA. Chromium deficits are very rare, and chromium feed supplements is not often applied. Chromium (III) toxicity is unlikely, at least when it is taken up through food and drinking water. It may even improve health, and cure neuropathy and encephalopathy. Hexavalent chromium is known for its negative health and environmental impact. It causes allergic and asthmatic reactions and it is 1000 times more toxic than trivalent chromium. Exposure to hexavalent chromium causes diarrhoea, stomach and intestinal bleeding, cramps, paralysis and liver and kidney damage. The hexavalent chromium is mutagenic and carcinogenic in nature. Toxic effects may be passed on to children through the placenta. Chromium oxide is a strong oxidant and after dissolution it forms chromium acid, which corrodes the organs. The lethal dose is approximately 1-2 gm. Most countries apply a legal limit of 50 ppb chromium in drinking water. A professional illness in chromium industries is chromium sores upon skin contact with chromates. Chromium trioxide dust uptake in the workplace may cause cancer, and damage the respiration tract.

Common Cr(VI) removal technologies for drinking water applications are ion exchange, membranes, reduction/precipitation/coagulation/filtration, sorptive media etc. The trivalent chromium can be removed by contacting the solution with a weak acid cation exchange resin. The chromate can be removed by a weak base anion exchange resin in the presence of acid [Chopra, Randhir C, "Removal of chromium, chromate, molybdate and zinc" U.S. Pat. No. 3,972,810 (1976)]. Each of the resins requires different regenerate so that the process will require bulky equipment due to the requirement for separate sites for the regeneration of the two resins. Thus the chromium can be removed but the other pollutant is added to its solution. The most common industrial chromium treatment methods are reduction/precipitation/filtration. In this process, the Cr(VI) is reduced to Cr(III) typically by some reductant and chromium precipitated out as $Cr(OH)_3$ and further coagulation were carried out with ferric salt and filtered. [Besselievre, E. B. (1969); The treatment of industrial wastes, McGraw-Hill, New York].

Reference may be made to Several U.S. Pat. Nos. 3,926,754; 4,036,726; and 4,123,339, which claims removal of hexa or trivalent chromium from wastewater electrochemically. In these patents, a process is described wherein wastewater containing hexavalent chromium ions is caused to flow between a plurality of electrodes. When the anode has a surface of iron/iron alloy/insoluble iron compound, an iron hydroxide derivative will be produced electrochemically. In this process, hexavalent chromium undergoes cathodic reduction to form trivalent chromium as insoluble chromic hydroxide, which complexes with iron at the anode The trivalent chromium compound, physically or chemically combine with the insoluble iron derivative to thereby permit removal from solution. The precipitate is then removed from aqueous by any conventional techniques.

Reference may be made to Jakobsen, K. and Laska, R. (1977) Advanced treatment methods for electroplating wasters, Pollution Engineering, 8:42-46] wherein aspearin as resin have been used in ion exchange for removal of chromium.

Another way of removing Cr(VI) from drinking water is to reduce the Cr(VI) to Cr(III) and precipitate it as chromium hydroxide. Reference may be made to El-Shafey. J. Phys. IV France, 107(2003) 419 wherein carbon sorbent has been used to remove Cr (VI) from aqueous solutions in the pH range 2.2-2.6.

Reference may be made to A. Li Bojic, M Purenovic and D Bojic, Water S A, 30(3), 2004, wherein micro-alloyed aluminium composite (MAIC) has been used as reducing agent for Cr(VI) removal from water. The mechanism of action is based on processes of reduction and co-precipitation by $Al(OH)_3$, because Cr(VI) is removed from the water phase as metal chromium and insoluble $Cr(OH)_3$ Reference may be made to Liora Rosenthal-Toib et al., Synthesis of stabilized nanoparticles of zinc peroxide, Chemical Engineering Journal Vol 136, March 2008, wherein stabilized nanoparticles of zinc peroxide were prepared by an oxidation-hydrolysis-precipitation procedure. However the surface modifiers used in the present invention are different from the one reported in prior art.

OBJECTIVE OF THE INVENTION

The main objective of the present invention is to provide a process for the removal of arsenic and Cr(III&VI) from the contaminated water.

Another objective of the present invention is to reduce the size of the zinc peroxide nanoparticles suitable for the removal of arsenic and Cr(III&VI) from the contaminated water Another object of the present invention is to provide a low cost, high yield and simple process for the removal of arsenic and Cr(III&VI) from the contaminated water by using nanoparticles of zinc peroxide.

Yet another object is to provide a process for the removal of arsenic and Cr(III&VI) from the contaminated water without getting any change in the pH of water after treatment.

Yet another object is to provide low cost $ZnO_2$ nanoparticles capped with glycerol/PVP/TEA having size 20±5 nm for the removal of arsenic and chromium from the contaminated water.

SUMMARY OF THE INVENTION

Accordingly, the present invention provides a process for the removal of arsenic and chromium from contaminated water using zinc peroxide nanoparticles comprising treating the contaminated water containing arsenic and chromium with the nanoparticles of zinc peroxide in a ratio (w/v) ranging from 8:1 to 12:1 (mg/ml), having the concentration of arsenic, Cr(III&VI) contamination below 50 ppm in water, at a temperature of 25-30° C., for a period of 5-10 min, followed by filtration to obtain the desired low concentrated contamination permissible drinking water.

In an embodiment of the present invention, the zinc peroxide nanoparticles used have size below 50 nm.

In another embodiment of the present invention, the amount of zinc peroxide used for the removal of arsenic and chromium is preferably in the range of 225-250 mg per 25 ppm of arsenic and chromium contaminated water.

In another embodiment of the present invention, the zinc peroxide nanoparticles are prepared by the process comprising the following steps:

a) dissolving zinc acetate in ammonium hydroxide to obtain a solution mixture having pH in the range of 9-11;

b) adding glycerol/PVP/TEA to the solution mixture obtained in step (a) in a ratio of zinc acetate to glycerol in the range of 2:0.5 to 6:1 (w/w), PVP in the range of 10:0.25 to 10:1 (w/w) and TEA in the range of 1:1 to 1:0.5 (w/w) with respect to zinc acetate respectively;

c) adding a polar organic solvent to the solution mixture obtained in step (h), under stirring, at ambient temperature in the range of 25-30° C., followed by adding equimolar quantity of hydrogen peroxide with respect to zinc acetate to obtain the desired nanoparticles of zinc peroxide.

In another embodiment of the present invention, the weight ratio of zinc acetate to glycerol used is preferably in the range of 2:0.5 to 3:1.

In another embodiment of the present invention, the weight ratio of zinc acetate to PVP used is preferably in the range of 10:0.5 to 10:1 (w/w).

In another embodiment of the present invention, the weight ratio of zinc acetate to TEA used is preferably in the range of 1:1 to 1:0.5 (w/w).

In another embodiment of the present invention, yield of $ZnO_2$ nanoparticles obtained is in the range of 98-99% with respect to the starting material.

In another embodiment of the present invention, the $ZnO_2$ nanoparticles removes arsenic, Cr(III&VI) each from 50 ppm to 0.1, 0.14, and 0.18 ppm, respectively without disturbing the pH of water.

In another embodiment of the present invention, the $ZnO_2$ nanoparticles removes arsenic, Cr(III&VI) each from 30 ppm to 0.03, 0.07 and 0.08 ppm, respectively without disturbing pH of the water.

In yet another embodiment of the present invention, the $ZnO_2$ nanoparticles removes arsenic, Cr(III&VI) each from 25 ppm to less than the detection limit of AAS-HG in case of arsenic and 0.01 in case of Cr(III&VI) without disturbing pH of the water.

In yet another embodiment of the present invention, the $ZnO_2$ nanoparticles removes arsenic, Cr(III&VI) each from 20 ppm to less than the detection limit of AAS-HG and FAAS/GFAAS respectively without disturbing pH of the water.

In yet another embodiment of the present invention, the $ZnO_2$ nanoparticles removes arsenic, Cr(III&VI) each from 15 ppm to less than the detection limit of AAS-HG and FAAS/GFAAS respectively without disturbing pH of the water.

In yet another embodiment of the present invention, the $ZnO_2$ nanoparticles removes arsenic, Cr(III&VI) each from 10 ppm to less than the detection limit of AAS-HG and FAAS/GFAAS respectively without disturbing pH of the water.

In still another embodiment of the present invention, the $ZnO_2$ nanoparticles removes arsenic, Cr(III&VI) each from 5 ppm to less than the detection limit of AAS-HG and FAAS/GFAAS respectively without disturbing pH of the water

BRIEF DESCRIPTION OF THE ACCOMPANYING DRAWINGS

FIG. 1 XRD Pattern of $ZnO_2$ powder

FIG. 2 TEM of $ZnO_2$ powder as synthesized

FIG. 3 TEM and EDS of $ZnO_2$ powder after reacting with arsenic (showing adsorption of arsenic on the surface of zinc peroxide)

FIG. 4 TEM of $ZnO_2$ powder after removing Arsenic

FIG. 5 TEM and EDS of $ZnO_2$ powder after reacting with chromium (showing adsorption of chromium on the surface of zinc peroxide)

FIG. 6 TEM of $ZnO_2$ powder after removing chromium

FIG. 7 FTIR of $ZnO_2$ powder after arsenic removing

FIG. 8 FTIR of $ZnO_2$ powder after Cr(III&VI) removal

DETAILED DESCRIPTION OF THE INVENTION

The present invention demonstrates the use of chemically prepared $ZnO_2$ nanoparticles capped with glycerol and PVP for removal of arsenic and chromium metal ion from the contaminated water. The synthesized $ZnO_2$ nanoparticles remove arsenic and chromium from the contaminated water from the level of 25 ppm to less than the detection limits of the AAS-HG and FAAS/GFAAS instruments used respectively, which is less than the USEPA prescribed limit 10 ppb for arsenic and 50 ppb for chromium for drinking water.

Synthesis of Zinc Peroxide Nanoparticles

In the present invention $ZnO_2$ nanoparticles, used for arsenic and chromium removal, were synthesized using zinc acetate di-hydrate as precursors in ammonical water medium at room temperature. For the synthesis of $ZnO_2$, 10 gm of zinc acetate was dissolved in minimum quantity of ammonia solution and it was diluted to 200 ml by acetone/methanol/ethanol water mixture (Water: solvent: 4:1). 0.5 gm PVP or 2.5 gm of glycerol or 1:1 quantity of TEA of with respect to zinc acetate were added to reduce the size of particles of the zinc peroxide. Further, 65 ml of hydrogen peroxide was added in above solution at pH 9-11 at room temperature. The maximum quantity of zinc peroxide nanoparticles of 20±5 nm were synthesized by varying quantity of the capping agent, pH and by varying solvent to water ratio. The solution was stirred on magnetic stirrer for 1 hour after adding hydrogen peroxide solution. The precipitate was centrifuged washed several times with 1:1 water-solvent mixture and then with de-ionized water several times. Finally the precipitate was dried at 105° C. in an oven up to complete dryness. XRD of synthesized zinc peroxide nanoparticles shows pure phase of zinc peroxide and HRTEM micrograph shows spherical nature of the nanoparticles. We have also synthesized particles of sizes 10±5 and 45±5 by varying the solvent and capping agent concentration. The efficiency increases as the particles sizes reduces. But at the same time it is not possible for us to separate the nanoparticles of zinc peroxide without centrifuge because particles of lower sizes float in the water and without centrifuge does not settled down. The particles of bigger sizes as claimed gets settled down and water can be separate easily. However we are in the process to make some device, which can filter the particles of low size.

Arsenic/Chromium Metal Ion Removal Using $ZnO_2$ Nanoparticles:

Standard arsenic and Cr(III) solutions of 1000-ppm concentration (SCP science USA) were used after desired dilutions, while 1000-ppm of Cr(VI) was prepared from high purity potassium dichromate following primary method and it was further diluted to desired range by proper dilution.

For each experiment known quantity (by weight) of $ZnO_2$ nanoparticles powder was mixed in 25 ml of standard arsenic/Cr(III) and Cr(VI) solution in an ultrasonic cleaner (5-10 min). The mixture was then subjected to 2-3 minutes of centrifugation process to remove the $ZnO_2$ nanoparticles. The remaining solution was filtered by any known method to remove the residual $ZnO_2$ nanoparticles like Buckner funnel. The filtered water was then tested for the left over arsenic, Cr(III) and Cr(VI) content.

In the present invention a highly sensitive hydride generation atomic absorption spectroscopy (HGAAS) was used in which arsenic in presence of hydrochloric acid and sodium borohydride forms arsenic hydride ($AsH_3$), which atomizes at 900° C. and produces the spectra. This technique is highly sensitive and arsenic can be detected up to 0.03 ppb.

The determination of Cr(III&VI) was carried out by Flame atomic absorption spectrometer at the optimize conditions for chromium, while the lower concentration less than 0.1 ppm were analyzed by graphite furnace atomic absorption spectrometer.

The novelty of the invention lies in the use of $ZnO_2$ nanoparticles as the adsorbent for arsenic/Cr(III&VI) metal ions and the level up to which it removes the arsenic/Cr(III&VI) concentration from 25 ppm to the potable limits (less than 0.01 ppm in case of arsenic and 0.01 n case of Cr(III&VI)).

Several experiment were carried out for varying quantity of arsenic. Cr(III&VI) with fixed quantity of $ZnO_2$ nanoparticles.

The following examples are given by the way of illustration and therefore should not be construed to limit the scope of the invention.

Example 1

Methods for the Preparation of $ZnO_2$ Nanoparticles Using Glycerol as Surface Modifier (i) 10 gm of zinc acetate was dissolved in 15 mL of ammonia solution and it was diluted to 200 ml of aqueous acetone (Water to solvent: 4:1). 2.5 gm of glycerol was added to the above solution mixture at pH 9.5 followed by adding 65 ml of hydrogen peroxide to obtain the nanoparticles of the zinc peroxide having average particle size distribution of 20±5 nm.

(ii) 10 gm of zinc acetate was dissolved in 15 mL of ammonia solution and it was diluted to 200 ml of aqueous acetone (Water to solvent: 4:1). 5 gm of glycerol was added to the above solution mixture at pH 9.5 followed by adding 65 ml of hydrogen peroxide to obtain the nanoparticles of the zinc peroxide having average particle size distribution of 10±5 nm.

(iii) 10 gm of zinc acetate was dissolved in 15 ml, of ammonia solution and it was diluted to 200 ml of aqueous acetone (Water to solvent: 4:1). 0.5 gm of glycerol was added to the above solution mixture at pH 9.5 followed by adding 65 ml of hydrogen peroxide to obtain the nanoparticles of the zinc peroxide having average particle size distribution of 45±5 nm.

Example 2

Preparation of $ZnO_2$ Nanoparticles Using PVP as Surface Modifier (i) 10 gm of zinc acetate was dissolved in 15 ml, of ammonia solution and it was diluted to 200 ml of aqueous methanol (Water to solvent: 4:1). 0.5 gm of PVP was added to the above solution mixture at pH 10, followed by adding 65 ml of hydrogen peroxide to obtain the nanoparticles of the zinc peroxide having average particle size distribution of 20±5 nm.

(ii) 10 gm of zinc acetate was dissolved in 15 mL of ammonia solution and it was diluted to 200 ml of aqueous methanol (Water to solvent: 4:1). 1 gm of PVP was added to the above solution mixture at pH 10, followed by adding 65 ml of hydrogen peroxide to obtain the nanoparticles of the zinc peroxide having average particle size distribution of 10±5 nm.

(iii) 10 gm of zinc acetate was dissolved in 15 mL of ammonia solution and it was diluted to 200 ml of aqueous methanol (Water to solvent: 4:1). 0.15 gm of PVP was added to the above solution mixture at pH 10, followed by adding 65 ml of hydrogen peroxide to obtain the nanoparticles of the zinc peroxide having average particle size distribution of 45±5 nm.

Example 3

Preparation of $ZnO_2$ Nanoparticles Using TEA as Surface Modifier (i) 10 gm of zinc acetate was dissolved in 15 mL of ammonia solution and it was diluted to 200 ml of aqueous ethanol (Water to solvent: 4:1). 5 gm of TEA was added to the above solution mixture at pH 11, followed by adding 65 ml of hydrogen peroxide to obtain the nanoparticles of the zinc peroxide having average particle size distribution of 20±5 nm.

(ii) 10 gm of zinc acetate was dissolved in 15 mL of ammonia solution and it was diluted to 200 ml of aqueous ethanol (Water to solvent: 4:1). 10 gm of TEA was added to the above solution mixture at pH 11, followed by adding 65 ml of hydrogen peroxide to obtain the nanoparticles of the zinc peroxide having average particle size distribution of 10±15 nm.

(iii) 10 gm of zinc acetate was dissolved in 15 ml, of ammonia solution and it was diluted to 200 ml of aqueous ethanol (Water to solvent: 4:1). 1.5 gm of TEA was added to the above solution mixture at pH 11, followed by adding 65 ml of hydrogen peroxide to obtain the nanoparticles of the zinc peroxide having average particle size distribution of 45±5 nm.

Example 4

Removal of Arsenic and Chromium From Water Using Zinc Peroxide Nanoparticles

Three different ranges nonmaterial i.e. 10±5, 45±5 and 20±5 nm sizes have been used for the removal of arsenic and Cr(III&VI). All the three ranges of $ZnO_2$ nanoparticles remove arsenic and Cr(III&VI) effectively. The particles of 10±5 nm sizes requires centrifuge after process to separate out from the water because the small particles get filtered through Buckner funnel. The arsenic and Cr(III&VI) efficiency of nanoparticles reduces as the size of nanoparticles increases (>50 nm). The following example has been given for the 20±5 nm size nanoparticles.

Quantity of $ZnO_2$ having average particle size distribution of 20±5 nm taken for process=0.25 g
Water taken=25 ml
Concentration of Arsenic and Cr(III&VI) taken=50 ppm
Concentration of Arsenic after treatment with $ZnO_2$=0.1 ppm
Concentration of Cr(III) after treatment with $ZnO_2$=0.14 ppm
Concentration of Cr(VI) after treatment with $ZnO_2$=0.18 ppm Example 5

Quantity of $ZnO_2$ having average particle size distribution of 20±5 nm taken for process=0.25 g Water taken=25 ml
Concentration of Arsenic and Cr(III&VI) taken=30 ppm
Concentration of Arsenic after treatment with $ZnO_2$=0.03 ppm
Concentration of Cr(III) after treatment with $ZnO_2$=0.07 ppm
Concentration of Cr(VI) after treatment with $ZnO_2$=0.08 ppm Example 6

Quantity of $ZnO_2$ having average particle size distribution of 20±5 nm taken for process=0.25 g
Water taken=25 ml
Concentration of Arsenic and Cr(III&VI) taken=25 ppm
Concentration of Arsenic after treatment with $ZnO_2$=below detection limit of AAS-HG instrument
Concentration of Cr(III) after treatment with $ZnO_2$=less than 0.01 ppm by GFAAS instrument
Concentration of Cr(VI) after treatment with $ZnO_2$=0.01 ppm by GFAAS instrument Example 7

Quantity of $ZnO_2$ having average particle size distribution of 20±5 nm taken for process=0.25 g
Water taken=25 ml
Concentration of Arsenic and Cr(III&VI) taken=20 ppm
Concentration of Arsenic after treatment with $ZnO_2$=below detection limit of AAS-HG instrument
Concentration of Cr(III) after treatment with $ZnO_2$=below detection limit of FAAS/GFAAS instrument
Concentration of Cr(VI) after treatment with $ZnO_2$=below detection limit of FAAS/GFAAS instrument Example 8

Quantity of $ZnO_2$ having average particle size distribution of 20±5 nm taken for process=0.25 g
Water taken=25 ml
Concentration of Arsenic and Cr(III&VI) taken=15 ppm
Concentration of Arsenic after treatment with $ZnO_2$=below detection limit of AAS-HG instrument
Concentration of Cr(III) after treatment with $ZnO_2$=below detection limit FAAS/GFAAS of instrument
Concentration of Cr(VI) after treatment with $ZnO_2$=below detection limit FAAS/GFAAS of instrument Example 9

Quantity of $ZnO_2$ having average particle size distribution of 20±5 nm taken for process=0.25 g
Water taken=25 ml
Concentration of Arsenic and Cr(III&VI) taken=10 ppm
Concentration of Arsenic after treatment with $ZnO_2$=below detection limit of AAS-HG instrument
Concentration of Cr(III) after treatment with $ZnO_2$=below detection limit FAAS/GFAAS of instrument
Concentration of Cr(VI) after treatment with $ZnO_2$=below detection limit FAAS/GFAAS of instrument Example 10

Quantity of $ZnO_2$ having average particle size distribution of 20±5 nm taken for process=0.25 g
Water taken=25 ml
Concentration of Arsenic, Cr(III&VI) taken=5 ppm Concentration of Arsenic after treatment with $ZnO_2$=below detection limit of AAS-HG instrument Concentration of Cr(III) after treatment with $ZnO_2$=below detection limit FAAS/GFAAS of instrument Concentration of Cr(VI) after treatment with $ZnO_2$=below detection limit FAAS/GFAAS of instrument Advantages of the Present Invention:
1. This invention makes the contaminated water almost free of arsenic and Cr(III&VI) after filtration that could be use for drinking and various household utilities.
2. Treatment with $ZnO_2$ nanoparticles maintains the pH of the water to the permissible limit.
3. The proposed method for the synthesis of zinc peroxide is eco-friendly and there is no generation of any toxic gases during synthesis.
4. The material was synthesized at low temperature and there is no requirement of any specific instruments.
5. The method gives more than 98% yield, which is an added advantage of the process.
6. The proposed material is low cost in comparison to other materials available for the removal of arsenic.
7. The solvent used in the synthesis process can be recovered by distillation, which is further added advantages of the process for reduction of the cost of the process.
8. The process does not add any impurities in the water as it is insoluble in water and can be separated by any known method.
9. The synthesis method is so simple and fast and within 2-3 hours on can get synthesized nanoparticles of zinc peroxide with more than 98% yield.
10. The particles of 10±5 are more efficiently removes arsenic and Cr(III&VI) from contaminated water but in this process centrifugation is essential to separate zinc peroxide from the water. The particles of 10±5 nm sizes can be synthesized by varying the concentration of solvent and capping agent.

We claim:

1. A process for preparing zinc peroxide nanoparticles comprising the following steps: a) dissolving zinc acetate in ammonium hydroxide to obtain a solution mixture having pH in the range of 9-11; b) adding glycerol/PVP/TEA to the solution mixture obtained in step (a) in a ratio of zinc acetate to glycerol in the range of 2:0.5 to 6:1(w/w), PVP in the range of 10:0.25 to 10:1 (w/w) and TEA in the range of 1:1 to 1:0.5 (w/w) with respect to zinc acetate respectively; c) adding a polar organic solvent to the solution mixture obtained in step (b), under stirring, at ambient temperature in the range of 25-30° C., followed by adding equimolar quantity of hydrogen peroxide with respect to zinc acetate to obtain the desired nanoparticles of zinc peroxide.

2. The process as claimed in claim 1, wherein the weight ratio of zinc acetate to PVP used is in the range of 10:0.5 to 10:1 (w/w).

3. The process as claimed in claim 1, wherein yield of $ZnO_2$ nanoparticles obtained is in the range of 98-99% with respect to the starting material.

4. The process as claimed in claim 1, wherein the size of zinc peroxide nanoparticles is below 50 nm.

5. The process as claimed in claim 4, wherein the size of zinc peroxide nanoparticles is 20±5 nm.

* * * * *